United States Patent Office 3,378,520
Patented Apr. 16, 1968

3,378,520
ORGANOPOLYSILOXANE COMPOSITIONS
CONVERTIBLE INTO ELASTOMERS
Hans Sattlegger, Cologne-Buchheim, Walter Noll, Opladen, Klaus Damm, Cologne-Flittard, and Hans Dietrich Gölitz, Cologne-Stammheim, Germany, assignors to Farbenfabriken Bayer Aktiengesellschaft, Leverkusen, Germany, a corporation of Germany
No Drawing. Filed Mar. 21, 1967, Ser. No. 624,707
Claims priority, application Germany, Apr. 1, 1966, F 48,830
4 Claims. (Cl. 260—46.5)

ABSTRACT OF THE DISCLOSURE

An organopolysiloxane composition capable of being plastically shaped and which is storable under exclusion of water and convertible into the solid elastic state in the presence of water, including atmospheric humidity, at a temperature of from room to 50° C., comprising a hydroxy or alkoxy terminated linear organopolysiloxane and a carboxylic acid amido substituted silane or siloxane as cross-linking agent is improved by the addition of a complex compound prepared from an alcoholate or phenolate of titanium, zirconium or aluminum with a diketone, a keto alcohol, a ketonic acid or a ketonic acid alkyl ester. This additive prevents the composition from premature cross-linking and increases the adhesion of the resulting elastomer to any substrate.

---

This invention relates to organopolysiloxane compositions and is especially concerned with compositions comprising organopolysiloxanes and certain cross-linking agents which are convertible into the solid elastic state at temperatures below 50° C. The invention more especially relates to such compositions which are prepared in the absence of water and then stored in tightly sealed containers, and which react, after their removal from the containers, under the action of water, for instance the moisture in the atmosphere, to form elastomers. The invention is an improvement of the inventions claimed in our copending applications Ser. Nos. 428,209 and 570,404.

Compositions having the above property are known; for example our copending application Ser. No. 428,209 describes and claims such a composition comprising (1) an organopolysiloxane as base siloxane having the formula

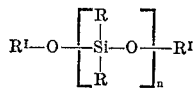

wherein $n$ is an integer greater than 1, $R^I$ is a hydrogen atom or an alkyl radical containing 1 to 4 carbon atoms, at least half of all the radicals R are methyl radicals and each other R is a hydrogen atom or an alkyl, alkenyl or aryl radical, and which may also contain, in addition to its $R_2SiO$ units, up to 10 mol percent of siloxane units of the formula $RSiO_{3/2}$, if desired in admixture with fillers, optionally also containing up to 10 percent by weight of the base siloxane of $\alpha,\omega$-bis-(trimethylsilyoxy)-polydimethylsiloxanes or up to 50 percent by weight of the base siloxane of methyl-polysiloxanes which consist of $(CH_3)_3SiO_{1/2}$ and $SiO_2$ units, in a molar ratio between 1:1 and 1:2; and (2) a cross-linking agent which is optionally diluted with an inert organic solvent and which is an organosilane of the formula $X_{4-a}SiY_a$ or an organosiloxane having the average formula

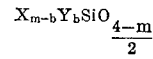

wherein each X is an unsubstituted or inertly substituted alkyl or aryl radical or a hydrogen atom, $a$ is 3 or 4, $m$ has a value in the range from 1 to 3 inclusive, and $b$ has maximally the value of $m$ and at least such a value that in each molecule there are three substituents Y, and Y is a Si–N-linked carboxyl acid amide radical of the formula

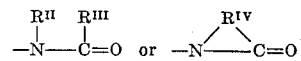

in which $R^{II}$ is an unsubstituted or inertly substituted alkyl or aryl radical, $R^{III}$ is a hydrogen atom or an unsubstituted or inertly substituted alkyl or aryl radical, and $R^{IV}$ is an unsubstituted or inertly substituted alkylene or alkarylene radical. According to a more recent proposal in our copending application Ser. No. 570,404 the cross-linking agent (2) may be modified with advantage by replacing certain of the substituents Y by alkoxy radicals containing 1 to 4 carbon atoms.

Even these more recent compositions possess certain disadvantages, concerning both their production and, in many cases, their application. Since these moisture-sensitive compositions will normally be prepared some time before they are used it is necessary for them to be kept free from water. However, the finely divided oxides which are generally used as fillers are very difficult to separate from the last traces of water and some cannot be completely separated at all. Furthermore, the admixing of the cross-linking agent and the drawing off of the finished paste must be carried out under a carefully dried protective atmosphere; this requires expensive equipment.

Another disadvantage which could not hitherto be overcome fully satisfactorily is that the cross-linking of the paste, when used in the open air, begins with the formation of a rubber-like film which makes moulding, for example pointing up of joints, very difficult or even impossible. The period of time until the film has formed, the so-called "open" time, normally lasts approximately 10 minutes and may even be shorter when the moisture content in the atmosphere is high. As a rule, a substantially longer duration of plasticity is desirable for the use of the compositions.

Finally, the property of the cross-linked product of being, in most cases, readily separable from the substrate is frequently a disadvantage. The general use, i.e. for coating, jointing and cementing purposes, requires a good bond between the cross-linked product and the substrate, which is for example of glass, metal or synthetic resin, which bond remains satisfactory even when exposed to the action of water for a prolonged time.

It has now been found that the three disadvantages described above can be obviated by the addition of certain compounds which have no cross-linking action but instead retard the start of the cross-linking reaction by absorbing water due to a hydrolytic reaction, and according to the present invention a plastically shapable organopolysiloxane composition which is convertible into an elastomer by the action of water contains 1 to 15 percent by weight (referred to the total composition) of a complex compound of titanium, zirconium or aluminium, said complex compound being one obtained by mixing an alcoholate or phenolate of the aforementioned metal, derived from an aliphatic or cycloaliphatic, optionally amino- or hydroxyl-substituted alcohol or from a phenol, or a partial hydrolysate thereof, with $\alpha$- or $\beta$-diketone, an $\alpha$- or $\beta$-keto alcohol, an $\alpha$- or $\beta$-ketonic acid or an $\alpha$- or β-ketonic acid alkyl ester, in a proportion of 1 to 4 mols of the keto compound per gram atom of the metal.

Sutiable metal alcoholates for use in making the complex compounds are those derived from ethanol, the propanols, the butanols, 2-ethylhexanol, cyclohexanol, triethanolamine, ethylene glycol, butylene glycol and phenol. Suitable keto compounds include, for example, diacetyl, diacetone alcohol and aceto-acetic acid ester. The complex compound may be formed, as is known, by simply stirring together the metal alcoholate and the keto compound, for example 1 mol of a tetraalkyl-orthotitanate and 2 mols ethyl acetoacetate. The alcohol thus liberated can be separated by distillation.

The action of these complex compounds is probably due to their sensitivity to hydrolysis, which causes the moisture entering from the atmosphere to be initially intercepted. By this means hydrolysis of the carboxylic acid amide-substituted organosilicon compounds contained in the organopolysiloxane composition as cross-linking agent is substantially delayed. This has the advantage for the production of the compositions according to the invention that the components to be mixed do not require any thorough previous drying. When all the components mentioned above under (1) are first mixed together and the metal complex compound is then added, the mixture is dehydrated chemically without the risk of cross-linking or even only a substantial increase in viscosity arising.

Consequently, another advantage is that a completely dry protective atmosphere is not necessary either during mixing or when the product is drawn off. However, care must be taken, by adopting a rapid procedure, that the metal complex is not completely used up in this process. When the paste is used, the advantage may be judged by the fact that a noticeable cross-linking starting from the surface, i.e. the formation of a rubber-like film, occurs only after the bulk of the metal complex has been decomposed. The "open" period of time up to this moment is dependent upon the type and proportion of this metal compound and can be extended up to some hours by appropriately choosing the latter; obviously, the cross-linking process progressing into the interior is also retarded. Table 1 below gives some examples showing to what extent the period of the plastic state can be varied.

The retarding of the commencement of cross-linking, described above, is the more striking as it is known that, in contrast, organic titanates and zirconates accelerate cross-linking in known mixtures which contain silicic acid esters or alkylalkoxysilanes as cross-linking agents (cf. U.S. patent specification No. 3,151,099 and British specification No. 962,061).

Finally, compositions improved according to the invention possess the further advantage of adhering very well to almost any substrate, for example flat glass, hollow glass, enamel and tiles, iron, chromium-nickel-steel, aluminium, zinc, tin and copper, elastomers which are cross-linked in the hot, polyvinyl chloride resins, acrylic resins and epoxide resins.

A number of examples (1 to 6) showing the constitution of improved compositions according to the invention are set out in Table 2, as are some comparative experiments (A to D); in this table, and in Table 1, the base siloxanes are $\alpha,\omega$-dihydroxypolydimethylsiloxanes having a polymerisation degree characterised by the viscosity indicated in each case cp. at 20° C., the fillers Q are silica flour, S is colloidally dispersed silicic acid obtained by flame hydroysis, T is finely divided aluminium oxide; and the "cross-linking agent" is di-(N-methylbenzamido)-methylethoxysilane of the formula

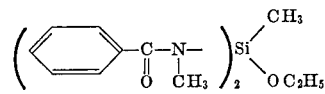

In Table 2: "%" stands for percent by weight of the whole mixture, and "complex" is the ethyl acetoacetate complex compound of the metal alcoholate specified, prepared from 2 mols of the keto compound for each gram atom of the metal.

In the tests all the compositions according to the invention proved to be stable to storage and well adhering to glass, iron, aluminium, copper and polyvinyl chloride. Of the comparative compositions indicated in Table 2, A gave a product which, although stable to storage, adhered insufficiently to the above-mentioned materials. The products according to B, C and D, although having good adhesive power, were not storable and were therefore useless.

TABLE 1

[(%=percent by weight, referred to a composition consisting of 70% base siloxane 15,000 cp., 20% filler Q, 4.5% filler S, 4.5% cross-linking agent, and 1% dibutyl-tin dilaurate)]

| | "Open time" with addition of— | | |
|---|---|---|---|
| | 1% | 5% | 11% |
| Complex additive from 1 mol— | | | |
| Ethyl-polytitanate plus 2 mol ethyl acetoacetate | 20 min | 32 min | 50 min. |
| Aluminium-sec.-butylate: | | | |
| Plus 2 mol ethyl acetoacetate | 17 min | 40 min | 2 hrs., 20 min. |
| Plus 1 mol ethyl acetoacetate | 1 hr | 2 hrs., 25 min | 6 hrs. |
| Tetra-n-butyl-orthotitanate: | | | |
| Plus 1 mol ethyl acetoacetate | 1 hr., 47 min | 1 hr., 57 min | 6 hrs. |
| Plus 1 mol diacetone alcohol | 1 hr., 35 min | 4 hrs | >8 hrs. |
| Plus 1 mol diacetyl | 3 hrs | 24 hrs | |

TABLE 2

| Components of the composition | Examples | | | | | | Compared with— | | | |
|---|---|---|---|---|---|---|---|---|---|---|
| | 1 | 2 | 3 | 4 | 5 | 6 | A | B | C | D |
| Base siloxane 700,000 cp. (%) | 47.8 | 47.8 | 47.8 | | | 51.0 | 59.3 | 53.3 | 54.5 | 55.6 |
| Base siloxane 15,000 cp. (%) | | | | 64.6 | 64.6 | | | | | |
| Base siloxane 2,500 cp. (%) | 8.7 | 8.7 | 8.7 | | | | | | | |
| Base siloxane 30 cp. (%) | | | | | | | 10.2 | 11.0 | 10.7 | 11.8 | 11.1 |
| Filler Q (%) | 26.1 | 26.1 | 26.1 | 17.3 | 17.3 | 20.4 | 23.0 | 21.0 | 24.7 | 22.3 |
| Filler S (%) | | | | 5.2 | 5.2 | | | | | |
| Filler T (%) | 4.3 | 4.3 | 4.3 | | | 4.1 | | 4.3 | | |
| Cross-linking agent (%) | 6.1 | 6.1 | 6.0 | 6.0 | 6.0 | 5.3 | 6.0 | 5.6 | 6.1 | 5.8 |
| Dibutyl-tin dilaurate (%) | 0.9 | 0.9 | 0.6 | 0.9 | | 0.9 | 0.7 | 0.8 | 0.9 | 0.9 |
| Tin octoate (%) | | | | | 0.9 | | | | | |
| Complex of tetraethyl orthotitanate (%) | 6.1 | | | | | | | | | |
| Complex of tetraisopropyl orthotitanate (%) | | | | | | .6.0 | | | | |
| Complex of tetra-n-butyl orthotitanate (%) | | 6.5 | | | | 8.1 | | | | |
| Complex of tetrahexyl orthotitanate (%) | | | | 6.0 | | | | | | |
| Complex of tetra-n-butyl orthozirconate (%) | | | 6.1 | | | | | | | |
| Tetra-n-butyl orthotitanate (%) | | | | | | | | 4.3 | | |
| n-Butyl polytitanate (%) | | | | | | | | | 2.0 | |
| Aluminum sec.-butylate (%) | | | | | | | | | | 4.3 |

What we claim is:
1. An organopolysiloxane composition capable of being plastically shaped and which is storable under exclusion of water and convertible into the solid elastic state in the presence of water, including atmospheric humidity, at a temperature of from room to 50° C., comprising
(1) a base siloxane having the formula

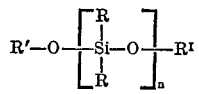

wherein $n$ is an integer number and has a value of at least 2, R' is a member selected from the group consisting of hydrogen and alkyl of 1 to 4 carbon atoms, each R is a member selected from the group consisting of hydrogen, alkyl, alkenyl and aryl, at least half of said R groups being methyl, and
(2) a cross-linking agent comprising an organosilicon compound selected from the group consisting of an organosilane having the formula $$X_{4-a}SiY_a$$

and an organosiloxane having the average formula

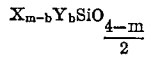

wherein each X is selected from the group consisting of hydrogen, alkyl and aryl, $a$ is 3 or 4, $m$ has a value in the range from 1 to 3 inclusive, $b$ has maximally the value of $m$ and at least such a value that in each molecule there are three substituents Y, and at least one per each three of these substituents Y is a Sn—N bonded carboxylic acid amide radical selected from the group consisting of

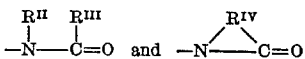

wherein $R^{II}$ is selected from the group consisting of alkyl and aryl, $R^{III}$ is selected from the group consisting of hydrogen, alkyl and aryl, and $R^{IV}$ is selected from the group consisting of alkylene and alkarylene, and all the remaining substituents Y are alkoxyl radicals having 1 to 4 carbon atoms, the said organopolysiloxane composition having admixed as retarding agent
(3) 1 to 15 percent by weight referred to the total composition of a complex compound of a metal selected from the group consisting of titanium, zirconium and aluminium, said complex compound being prepared by mixing an alcoholate or phenolate of the said metal, derived from a member selected from the group consisting of an aliphatic alcohol, a cycloaliphatic alcohol, an amino-substituted alcohol, a glycol, and a phenol, including partial hydrolysates, with a difunctional keto compound selected from the group consisting of an α-diketone, a β-diketone, an α-keto alcohol, a β-keto alcohol, an α-ketonic acid, a β-ketonic acid, and α-ketonic acid alkyl ester and a β-ketonic acid alkyl ester, in a proportion of 1 to 4 mols of the keto compound per gram atom of the metal.

2. A composition according to claim 1 wherein the said metal alcoholate is derived from a member selected from the group consisting of ethanol, a propanol, a butanol, 2-ethylhexanol, cyclohexanol, triethanolamine, ethylene glycol, and butylene glycol.

3. A composition according to claim 1 wherein the said difunctional keto compound is selected from the group consisting of diacetyl, diacetone alcohol, and acetoacetic acid ester.

4. A composition according to claim 1 wherein the complex compound (3) is that prepared by mixing an alkyl-titanate and ethyl acetoacetate in a proportion of 2 mols of the acetoacetate per gram atom of titanium.

References Cited
UNITED STATES PATENTS 3,151,099 9/1964 Ceyzeriat et al. ----- 260—46.5
3,334,067 8/1967 Weyenberg -------- 260—46.5

DONALD E. CZAJA, *Primary Examiner.*

M. I. MARQUIS, *Assistant Examiner.*

UNITED STATES PATENT OFFICE
CERTIFICATE OF CORRECTION

Patent No. 3,378,520            April 16, 1968

Hans Sattlegger et al.

It is certified that error appears in the above identified patent and that said Letters Patent are hereby corrected as shown below:

Column 2, line 11, "carboxyl" should read -- carboxylic --. Column 3, line 3, "Sutiable" should read -- Suitable --. Column 5, line 33, "Sn-N" should read -- Si-N --. Column 6, line 16, "and" should read -- an --.

Signed and sealed this 14th day of October 1969.

(SEAL)
Attest:

Edward M. Fletcher, Jr.           WILLIAM E. SCHUYLER, JR.
Attesting Officer                   Commissioner of Patents